(12) United States Patent
Forster

(10) Patent No.: US 12,112,221 B2
(45) Date of Patent: Oct. 8, 2024

(54) SHIELDING AND/OR ENHANCEMENT OF TEMPERATURE-SENSING RFID DEVICES

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/366,852

(22) Filed: Aug. 8, 2023

(65) Prior Publication Data
US 2024/0020508 A1    Jan. 18, 2024

Related U.S. Application Data

(62) Division of application No. 16/706,012, filed on Dec. 6, 2019, now Pat. No. 11,783,154.

(Continued)

(51) Int. Cl.
*G06K 19/077* (2006.01)
*G06K 19/07* (2006.01)

(52) U.S. Cl.
CPC ..... *G06K 19/0773* (2013.01); *G06K 19/0723* (2013.01); *G06K 19/07775* (2013.01)

(58) Field of Classification Search
CPC ........... G06K 19/0773; G06K 19/0723; G06K 19/07775
See application file for complete search history.

(56) References Cited

U.S. PATENT DOCUMENTS

| 6,847,912 B2 | 1/2005 | Forster |
| 8,947,236 B2 | 2/2015 | Forster |

(Continued)

FOREIGN PATENT DOCUMENTS

| CN | 102459789 A | * | 5/2012 | ............ C09J 163/00 |
| EP | 2458353 | | 5/2012 | |

(Continued)

OTHER PUBLICATIONS

International Preliminary Report on Patentability dated Jun. 8, 2021 issued in corresponding IA No. PCT/US2019/064930 filed Dec. 6, 2019.

(Continued)

*Primary Examiner* — Kam Wan Ma

(57) ABSTRACT

A temperature-sensing RFID device includes an RFID chip and an antenna electrically coupled thereto. The RFID chip includes a temperature sensor, while the antenna is adapted to receive energy from an RF field and produce a signal. A shielding structure and/or a thermally conductive or absorbent structure may be associated with the RFID chip. The shielding structure is oriented so as to be positioned between at least a portion of the RFID chip and an outside environment and configured to shield the temperature sensor from at least one environmental factor capable of affecting a temperature sensed by the temperature sensor of an article to which the RFID device is secured. The thermally conductive or absorbent structure is oriented so as to be positioned between at least a portion of the RFID chip and the article and configured to enhance thermal coupling between the temperature sensor and the article.

8 Claims, 4 Drawing Sheets

Related U.S. Application Data

(60) Provisional application No. 62/776,254, filed on Dec. 6, 2018.

(56) References Cited

U.S. PATENT DOCUMENTS

| | | | |
|---|---|---|---|
| 9,911,079 B2 | 3/2018 | Kato et al. | |
| 2006/0103535 A1* | 5/2006 | Pahlaven | G06K 7/10306 |
| | | | 340/572.1 |
| 2007/0063058 A1* | 3/2007 | Iwakata | G06K 7/10326 |
| | | | 235/492 |
| 2008/0018473 A1* | 1/2008 | Tsai | G06K 19/07749 |
| | | | 340/572.7 |
| 2009/0309703 A1* | 12/2009 | Forster | H01Q 1/2225 |
| | | | 340/10.1 |
| 2012/0016258 A1 | 1/2012 | Webster et al. | |
| 2012/0106589 A1 | 5/2012 | Ozawa | |
| 2012/0182147 A1 | 7/2012 | Forster | |
| 2012/0242318 A1* | 9/2012 | Forster | G06K 19/07749 |
| | | | 29/601 |
| 2012/0249303 A1* | 10/2012 | Hadley | H02M 7/217 |
| | | | 235/492 |
| 2012/0278676 A1* | 11/2012 | Teraura | G06F 11/1489 |
| | | | 235/492 |
| 2015/0053086 A1* | 2/2015 | Rebouillat | B01D 71/022 |
| | | | 96/11 |
| 2015/0059214 A1* | 3/2015 | Donovan | A43B 3/34 |
| | | | 33/3 A |
| 2016/0158082 A1* | 6/2016 | Gainor | A61B 6/0407 |
| 2017/0248475 A1 | 8/2017 | Bonifas et al. | |
| 2017/0328780 A1 | 11/2017 | Yuan et al. | |
| 2018/0189623 A1 | 7/2018 | Forster et al. | |

FOREIGN PATENT DOCUMENTS

| | | |
|---|---|---|
| JP | 2011-27515 | 2/2011 |
| JP | 2015-111048 | 6/2015 |
| JP | 2016-114541 | 6/2016 |
| JP | 2016-115126 | 6/2016 |
| JP | 2016-191613 | 11/2016 |
| JP | 2016191613 A * | 11/2016 |
| JP | 2017-123157 | 7/2017 |
| JP | 2018-184488 | 11/2018 |
| WO | 2014/125726 | 8/2014 |
| WO | 2016/185905 | 11/2016 |

OTHER PUBLICATIONS

International Search Report and Written Opinion dated Jun. 23, 2020 issued in corresponding IA No. PCT/US2019/064930 filed Dec. 6, 2019.

Invitation to Pay Additional Fees dated Mar. 17, 2020 issued in corresponding IA No. PCT/US2019/064930 filed Dec. 6, 2019.

* cited by examiner

SHIELDING AND/OR ENHANCEMENT OF TEMPERATURE-SENSING RFID DEVICES

CROSS REFERENCE TO RELATED APPLICATION(S)

The present application is a division of U.S. patent application Ser. No. 16/706,012 filed Dec. 6, 2019, and claims the benefit of U.S. Provisional Patent Application No. 62/776,254 filed Dec. 6, 2018, both of which are incorporated herein by reference in their entireties.

FIELD OF THE DISCLOSURE

The present subject matter relates to radio frequency identification ("RFID") devices capable of sensing a temperature. More particularly, the present subject matter relates to environmental shielding and/or enhancement of RFID devices capable of sensing a temperature.

DESCRIPTION OF RELATED ART

Electrically powered devices for sensing a material or condition are well known. This includes RFID devices incorporating sensors for determining and communicating the temperature of an article to which the RFID device is associated, such as the temperature of a food item or article, including packaged articles intended to be stored under certain environmental conditions and to which the RFID device is secured. Such an RFID device is described in U.S. Pat. No. 6,847,912, which is hereby incorporated herein by reference.

One challenge with devices of the type described in U.S. Pat. No. 6,847,912 is ensuring that the measured temperature corresponds to the temperature of the article to which the device is secured, rather than the temperature of the local environment, which can vary rapidly. Contrary to this prior art, the present subject matter presents the improvement of providing embodiments in which temperature-sensing RFID devices are shielded from environmental conditions that would affect measurement of the temperature of an article to which the device is secured and/or are otherwise configured for enhanced detection of the temperature of an associated article itself.

SUMMARY

There are several aspects of the present subject matter, which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a temperature-sensing RFID device includes an RFID chip having a temperature sensor. An antenna is electrically coupled to the RFID chip and adapted to receive energy from an RF field and produce a signal. A shielding structure is associated with the RFID chip and oriented so as to be positioned between at least a portion of the RFID chip and an outside environment. The shielding structure is configured to shield the temperature sensor from at least one environmental factor capable of affecting a temperature sensed by the temperature sensor of an article to which the temperature-sensing RFID device is secured.

In another aspect, a temperature-sensing RFID device includes an RFID chip having a temperature sensor. An antenna is electrically coupled to the RFID chip and adapted to receive energy from an RF field and produce a signal. A thermally conductive or absorbent structure is associated with the RFID chip and oriented so as to be positioned between at least a portion of the RFID chip and an article to which the temperature-sensing RFID device is to be secured. The thermally conductive or absorbent structure is configured to enhance thermal coupling between the temperature sensor and the article.

In a further aspect, a temperature-sensing RFID device includes both a shielding structure and a thermally conductive or absorbent structure associated with an RFID chip having a temperature sensor and an antenna coupled to the RFID chip to receive energy from an RF field and produce a signal designating a temperature of an article to which the temperature-sensing RFID device is secured.

In an additional aspect, a temperature-sensing RFID device includes an RFID chip having a temperature sensor. An antenna is electrically coupled to the RFID chip and adapted to receive energy from an RF field and produce a signal. A thermally conductive or absorbent structure is associated with the RFID chip and oriented so as to be positioned between at least a portion of the RFID chip and an article to which the temperature-sensing RFID device is to be secured. The thermally conductive or absorbent structure is configured to enhance thermal coupling between the temperature sensor and the article. The antenna includes a loop structure having a portion that acts as the thermally conductive or absorbent structure.

In yet another aspect, a temperature-sensing RFID device includes an RFID chip having a temperature sensor. The temperature-sensing RFID device further includes an antenna adapted to receive energy from an RF field and produce a signal. The antenna includes a first portion directly coupled to the RFID chip and a second portion separated from the RFID chip and from the first portion of the antenna by a thermally isolating gap. The second portion of the antenna is configured to be coupled to the RFID chip by a magnetic field, an electric field, or both a magnetic field and an electric field.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 1:
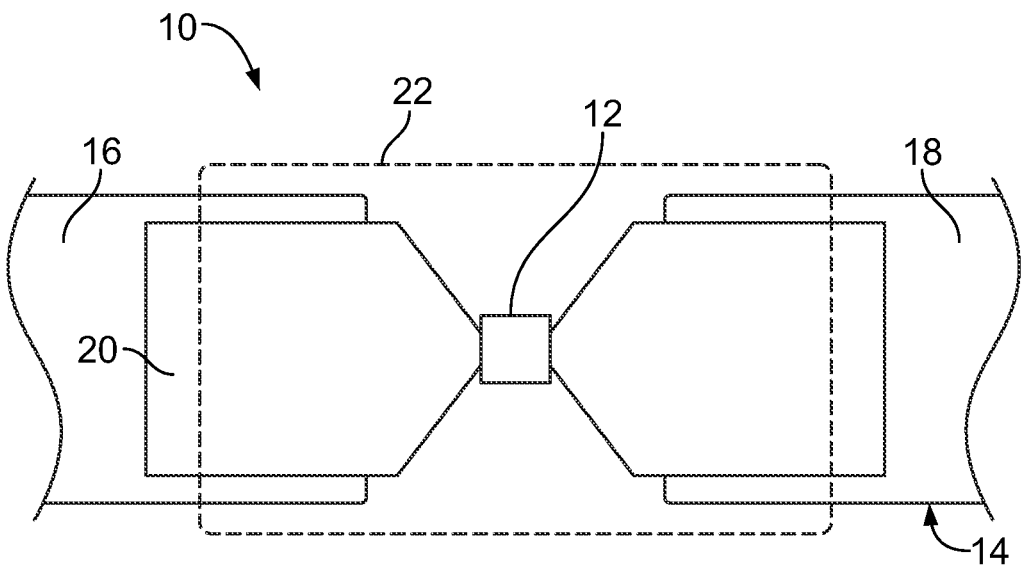
FIG. 1 is a top plan view of a temperature-sensing RFID device having a shielding structure according to an aspect of the present disclosure.

FIG. 1 shows an RFID device, generally designated at 10, according to the present disclosure. The RFID device 10 includes an RF communication chip 12, which may include an integrated circuit for controlling RF communication and other functions of the RFID device 10. The RFID chip 12 further includes a temperature sensor configured and oriented to determine the temperature of an article to which the RFID device 10 is secured, such as a food item to provide information concerning possible food safety parameters for the particular food item, such as having its temperature raised to a level triggering a potential concern.

The RF chip 12 is electrically connected or coupled to an antenna, generally designated at 14. The RFID chip 12 and the antenna 14 may be at least partially formed of a reflective material, such as aluminum foil. The illustrated antenna 14 has first and second conductors 16 and 18, respectively, positioned at opposite lateral sides of the RFID chip 12, with the conductors 16 and 18 being electrically coupled to the RFID chip 12 by a strap 20. In one embodiment, the RFID chip 12 is attached to the strap 20 by an anisotropic conductive paste, such as an adhesive with particles such as ceramics and/or metals. The antenna 14 is configured to receive energy from an RF field and produce a signal that is transmitted to one or more external devices (not shown), such as a controller or reader or detector, configured to receive and analyze the signal. The RF field may be generated by the device to which the antenna 14 transmits the signal, or it may be generated by a different external device.

Figure 2:
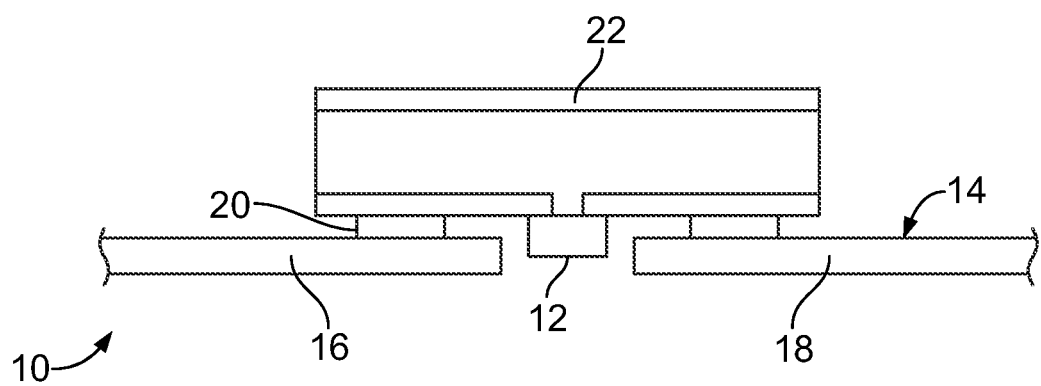
FIG. 2 is a schematic cross-sectional view of another embodiment of a temperature-sensing RFID device having a shielding structure according to an aspect of the present disclosure.

While the temperature sensor of the RFID chip 12 is configured to detect the temperature of the article to which the RFID device 10 is secured, it is possible for environmental factors to interfere with detection of the proper temperature. Accordingly, to protect the RFID chip 12 from such environmental factors, the RFID device 10 of this embodiment is provided with a shielding structure 22 positioned between the RFID chip 12 and the outside environment (i.e., with the RFID chip 12 positioned between the shielding structure 22 and the article to which the RFID device 10 is secured). The shielding structure 22 may be variously configured, such as being configured to overlay the entire RFID chip 12 and a portion of the strap 20 (as in FIG. 1) or being limited to the bounds of the RFID chip 12 (as in FIG. 2). In other embodiments, the shielding structure 22 may overlay only a portion of the RFID chip 12, though it may be preferred for the shielding structure 22 to overlay and protect the entire RFID chip 12.

By way of example, if the active components of the RFID chip 12 (which may include transistors, diodes, the temperature sensor, etc.) are exposed to infrared light, the components may become heated or the infrared light may cause other effects due to photoelectric effects, which may affect the temperature sensed by the temperature sensor. For example, exposure of the silicon of the RFID chip 12 to infrared radiation can cause the RFID chip 12 to heat up and increase the temperature detected by the temperature sensor. Accordingly, it may be advantageous for the shielding structure 22 to be comprised of a material configured to reflect infrared radiation away from the RFID chip 12. This may include the shielding structure 22 being at least partially formed of an aluminum material. Alternatively or additionally, at least a portion of a surface of the shielding structure 22 facing the outside environment may be configured with an infrared-reflecting color, such as white. For example, at least a portion of an outwardly facing surface of the shielding structure 22 may be formed of an opaque, white material, such as plastic or dense paper.

According to another aspect of the present disclosure, the shielding structure 22 may be at least partially formed of a thermally non-conductive material to prevent, or at least significantly or extensively retard, the temperature of the outside environment from affecting the temperature detected by the temperature sensor. For example, the shielding structure 22 may be at least partially formed of a foam material or a corrugated cardboard material. Such a shielding structure 22 reduces the thermal coupling between the RFID chip 12 and the outside environment (which may have a temperature that changes rapidly), thus increasing the accuracy of the temperature sensor in measuring the temperature of the article to which the RFID device 10 is secured. It might be considered that such an approach in effect modifies the thermal properties of the label, tag, sticker, etc. associated with the RFID chip 12 having the temperature sensor.

These different configurations of shielding structures 22 may be employed separately or in any combination. Additionally, it is within the scope of the present disclosure for the antenna 14 to be directly cut onto the shielding structure 22 (e.g., using a laser), rather than being separately provided.

Figure 3:
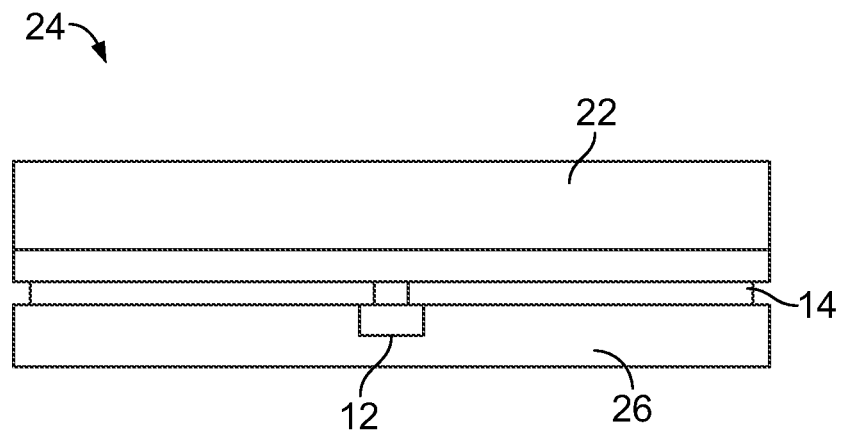
FIG. 3 is a schematic cross-sectional view of a temperature-sensing RFID device having a thermally conductive or absorbent structure according to an aspect of the present disclosure.
Figure 4:
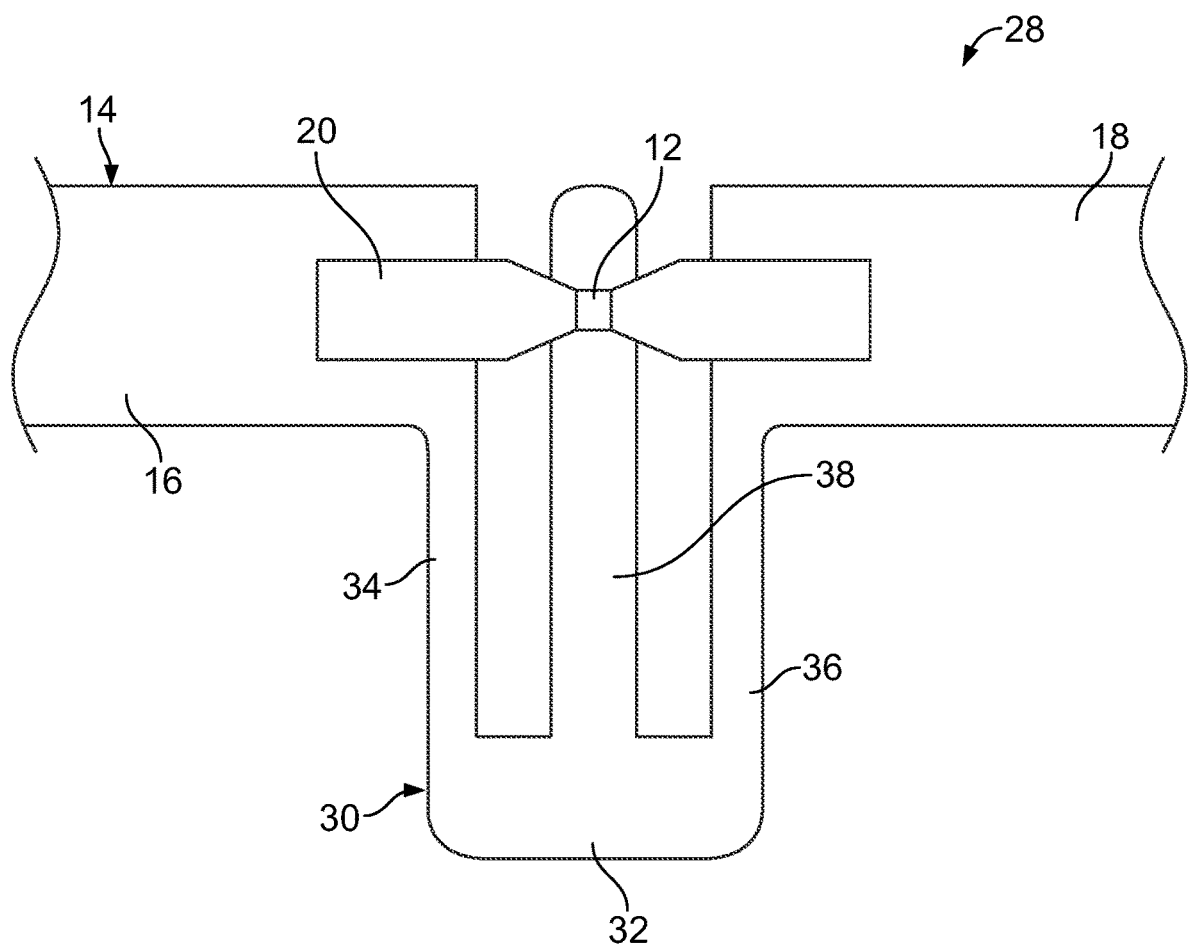
FIG. 4 is a top plan view of another embodiment of a temperature-sensing RFID device having a thermally conductive or absorbent structure according to an aspect of the present disclosure.

It will be seen that shielding structures 22 according to the present disclosure will improve the performance of a temperature-sensing RFID device 10 by protecting the RFID chip 12 of the RFID device 10 from environmental factors external to the article itself that is the object of temperature monitoring. Another aspect or embodiment of the present disclosure (which may be practiced either separately or in combination with a shielding structure 22) is a thermally conductive or absorbent structure that enhances the thermal coupling between the temperature sensor and the article to which the RFID device is secured. FIGS. 3 and 4 show exemplary embodiments of such a thermally conductive or absorbent structure, which is positioned between at least a portion of the RFID chip 12 and the article to which the RFID device is secured.

In the embodiment of FIG. 3, the RFID device 24 includes both a shielding structure 22 positioned above or outwardly of the RFID chip 12 and a thermally conductive or absorbent structure 26 positioned below or inwardly of the RFID chip 12 (and preferably in direct contact with both the RFID chip 12 and the article to which the RFID device 24 is secured). It should be understood that these two structures 22 and 26 may be separately incorporated into an RFID device, though providing both may be advantageous for improved shielding and/or a combination of shielding and enhanced thermal coupling between the temperature sensor and the article to which the RFID device is secured.

The thermally conductive or absorbent structure 26 may be variously configured without departing from the scope of the present disclosure. In one embodiment, at least a portion of the thermally conductive or absorbent structure 26 has an infrared-absorbing color, such as black. The thermally conductive or absorbent structure 26 may include an adhesive comprising particles having a greater thermal conductivity than the remainder of the adhesive, such as metallic particles and/or certain ceramic particles to increase the thermal coupling between the RFID chip 12 and the article to which the RFID device 24 is secured. The thermally conductive or absorbent structure 26 may also (or additionally) have a thermal mass selected for enhanced tracking of the temperature of the article to which the RFID device 24 is secured. For example, a thermal mass that tends to average the internal temperature of the article may be selected, such that transient temperature fluctuations are smoothed out. As the RFID device 24 only reports temperature when read, this may result in a more reliable thermal history.

FIG. 4 illustrates an embodiment having a differently configured thermally conductive or absorbent structure. In the embodiment of FIG. 4, a portion of the antenna 14 acts as a thermally conductive or absorbent structure, preferably being in direct contact with at least a portion of the RFID chip 12 and configured to be in direct contact with the article to which the RFID device 28 is secured. As a metallic material with a relatively large area, the antenna 14 is a relatively good thermal conductor, such that the temperature of the article to which the RFID device 28 is secured is readily transferred to the temperature sensor. For example, increased efficiencies in thermally coupling the article (e.g. a food article) can be achieved by antenna structures having an especially large area, such as through the use of an antenna of a sloop type of structure. Such efficiencies include enhancing the transmission of a changing heat condition or temperature of the article to the RFID chip 12 and its temperature sensor. In contrast, in an RFID device omitting a thermally conductive or absorbent structure, the RFID chip may be separated from the article by a pressure-sensitive adhesive (PSA) or other securement materials that are poor thermal conductors compared to the metallic material of an antenna.

In the embodiment of FIG. 4, the antenna 14 includes a conductive loop generally designated at 30, with a portion of the conductive loop 30 serving as the thermally conductive or absorbent structure. The conductive loop 30 may be variously configured without departing from the scope of the present disclosure, but in the illustrated embodiment, the conductive loop 30 extends between the first conductor 16 and the second conductor 18 and is at least partially formed of a metallic material, such as an aluminum foil. The illustrated conductive loop 30 includes a bridge 32 spaced away from the RFID chip 12 and both of the first and second conductors 16 and 18. A first leg 34 of the conductive loop 30 extends between the first conductor 16 and the bridge 32, while a second leg 36 of the conductive loop 30 extends between the second conductor 18 and the bridge 32. An extension 38 of the conductive loop 30 extends between the bridge 32 and the RFID chip 12, with a portion of the extension 38 preferably being in direct contact with the RFID chip 12 and with the article to which the RFID device 28 is secured and/or to be monitored.

In the illustrated embodiment, the extension 38 is associated with a midsection of the bridge 32, while the first and second legs 34 and 36 are associated with first and second ends of the bridge 32, respectively. It should be understood that the illustrated configuration of the conductive loop 30 shown in FIG. 4 is merely exemplary of this concept and that the conductive loop may be differently configured from that specifically designated at 30 in FIG. 4 without departing from the scope of the present disclosure.

Figure 5:
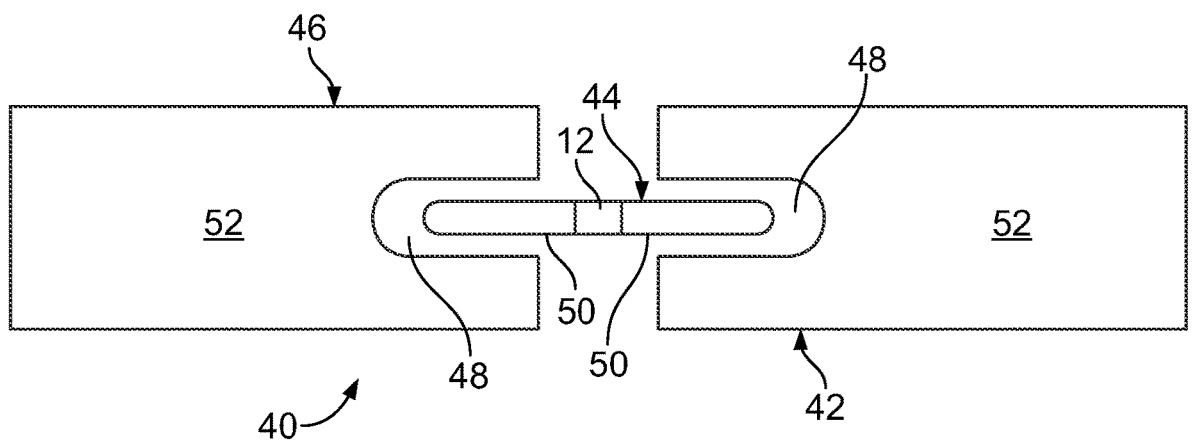
FIG. 5 is a top plan view of a temperature-sensing RFID device having an antenna with a portion that is physically separated from an RFID chip of the RFID device according to an aspect of the present disclosure.

FIG. 5 shows another embodiment of a temperature-sensing RFID device 40 according to the present disclosure. In the embodiment of FIG. 5, the antenna 42 is not monolithically formed or configured as a singular structure, but rather is composed of a first or minor portion 44 and a separate second or major portion 46. The minor portion 44 is physically connected to the RFID chip 12, while the major portion 46 is physically separated from the minor portion 44 of the antenna 42 and from the RFID chip 12 by a gap 48. Due to the major portion 46 of the antenna 42 being separated from the minor portion 44 of the antenna 42 and from the RFID chip 12, it is coupled to the RFID chip 12 at RF frequencies (e.g., 915 MHz) by either magnetic fields, electric fields, or both.

In the illustrated embodiment, the minor portion 44 of the antenna 42 comprises a pair of similarly shaped foil elements 50 (connected to the RFID chip 12 by pads, for example) extending in opposite directions from the RFID chip 12, with the major portion 46 of the antenna 42 also comprising a pair of similarly shaped foil elements 52. Each foil element 52 of the major portion 46 of the antenna 42 is generally aligned with a corresponding foil element 50 of the minor portion 44 of the antenna 42, but separated from the associated foil element 50 of the minor portion 44 by the gap 48 (across which the major portion 46 of the antenna 42 is coupled to the RFID chip 12 by either magnetic fields, electric fields, or both). It should be understood that the embodiment of FIG. 5 is merely exemplary and that the antenna 42 may be differently configured without departing from the scope of the present disclosure, such as with the individual foil elements 50, 52 being differently shaped and/or positioned and/or for either or each portion 44, 46 of the antenna 42 being defined by a different number of foil elements.

Regardless of the particular configuration of the minor and major portions 44 and 46 of the antenna 42, the gap(s) 48 between the minor and major portions 44 and 46 serve to reduce the amount of heat transfer from the antenna 42 to the RFID chip 12. As shown in FIG. 5, the major portion 46 of the antenna 42 is significantly larger than the minor portion 44 of the antenna 42. The relatively large major portion 46 of the antenna 42 will have a tendency to pick up unwanted thermal energy, which would be transferred to the RFID chip 12 (thereby affecting the performance of a temperature sensor of the RFID chip 12) if the major portion 46 were physically coupled to the RFID chip 12. However, reducing the size of the antenna 42 (to reduce the amount of unwanted thermal energy picked up by the antenna 42) may be impracticable due to a reduction in size also hampering the performance of the antenna 42. By providing a gap 48 between the minor portion 44 of the antenna 42 (which will transfer less heat to the RFID chip 12 due to being relatively small) and the major portion 46, the major portion 46 may remain sufficiently large to ensure proper operation of the antenna 42 without any unwanted thermal energy picked up by the major portion 46 being transferred to the RFID chip 12 (which is prevented by the presence of the gap(s) 48).

Figure 6:
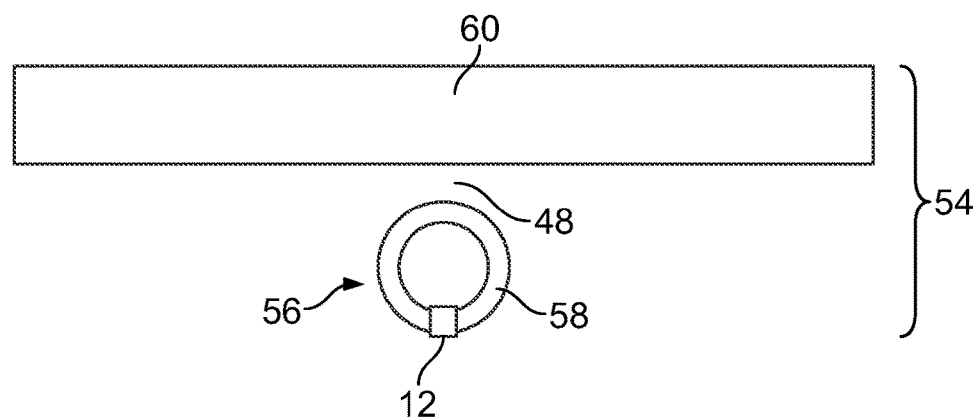
FIG. 6 is a top plan view of another embodiment of a temperature-sensing RFID device having an antenna with a portion that is physically separated from an RFID chip of the RFID device.

FIG. 6 shows an RFID device 54 that is a variation of the RFID device 40 of FIG. 5. In the embodiment of FIG. 6, the RFID device 54 includes a reactive strap 56, which is comprised of an RFID chip 12 connected to a conductive ring or loop of conductor 58. The reactive strap 56 may include thermal insulators, conductors, or a combination of both in order to control its coupling to a sensed material. In addition to the reactive strap 56, the RFID device 54 of FIG. 6 includes an antenna component 60 that is separated from the reactive strap 56 by a thermally isolating gap 48, with the antenna component 60 being coupled to the RFID chip 12 across the gap 48 by a magnetic field.

The RFID device 54 of FIG. 6 may be understood as being a variation of the RFID device 40 of FIG. 5, with the conductive ring or loop of conductor 58 corresponding to the first or minor portion 44 of the antenna 42 of FIG. 5 and the antenna component 60 corresponding to the second or major portion 46 of the antenna 42 of FIG. 5. As in the embodiment of FIG. 5, the antenna component/antenna major portion 60 is relatively large to enhance operation of the RFID device 54, while the gap 48 serves to thermally isolate the antenna component/antenna major portion 60 from the conductive ring or loop of conductor/antenna minor portion 58 and from the RFID chip 12, thereby preventing unwanted thermal energy picked up by the antenna component/antenna major portion 60 from being transferred to the RFID chip 12.

Figure 7:
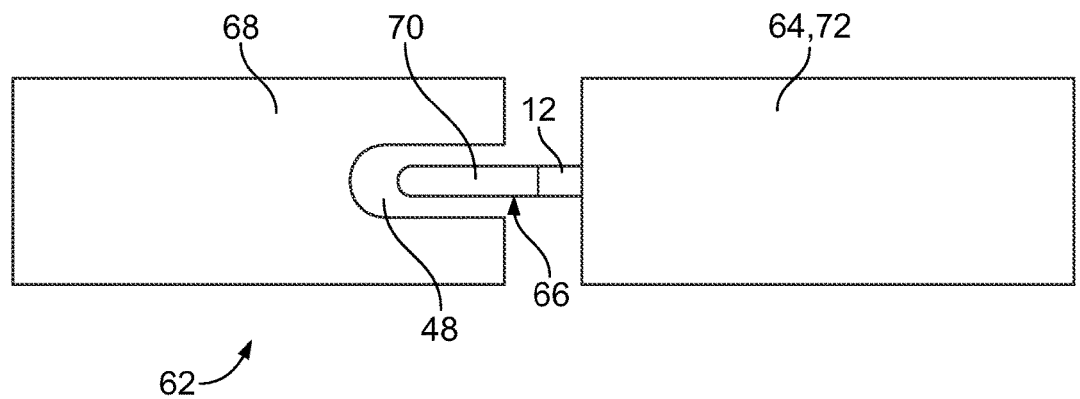
FIG. 7 is a top plan view of yet another embodiment of a temperature-sensing RFID device having an antenna with a portion that is physically separated from an RFID chip of the RFID device.

FIG. 7 illustrates another variation of the RFID device 40 of FIG. 5. As in the embodiment of FIG. 5, the RFID device 62 of FIG. 7 includes an RFID chip 12 directly connected to a first portion 64 of an antenna 66, while being separated from a second portion 68 of the antenna 66 by a gap 48 (which also separates the two portions 64 and 68 of the antenna 66). Unlike the embodiment of FIG. 5, the first portion 64 of the antenna 66 is not configured to have an especially small size (to minimize any thermal connection to the RFID chip 12), but rather has a size and shape that are selected in order to provide a desired thermal connection between the associated RFID chip 12 and an article to which the RFID device 62 is to be secured for sensing the temperature of the article. Also unlike the embodiment of FIG. 5, the first portion 64 of the antenna 66 is shown in FIG. 7 as being comprised of a pair of foil elements 70 and 72 that are differently configured. One of the foil elements 70 is illustrated as being sized and shaped like a foil element 50 of the first portion 44 of the antenna 42 of FIG. 5, while the other foil element 72 is illustrated as being significantly larger (on the order of the size of one of the foil elements 52 of the major portion 46 of the antenna 42 of FIG. 5). As the larger foil element 72 will be more greatly affected by temperature changes than the smaller foil element 70, it will be understood that the larger foil element 72 plays a greater role in providing the RFID chip 12 with a desired thermal connection.

As in the embodiment of FIG. 5, the second portion 68 of the antenna 66 is coupled to the first portion 64 across the gap 48 (e.g., by an electric field), with the gap 48 thermally isolating the second portion 68 from the RFID chip 12 and from the first portion 64 of the antenna 66 in order to control the nature of thermal coupling to the RFID chip 12. In the embodiments of FIGS. 5 and 7, the various portions of the antennas are configured to provide each gap 48 with a generally uniform or constant width, but it should be understood that the portions of the antennas may be differently configured to provide one or more gaps 48 with a non-uniform or varying width, as in the embodiment of FIG. 6.

Figure 8:
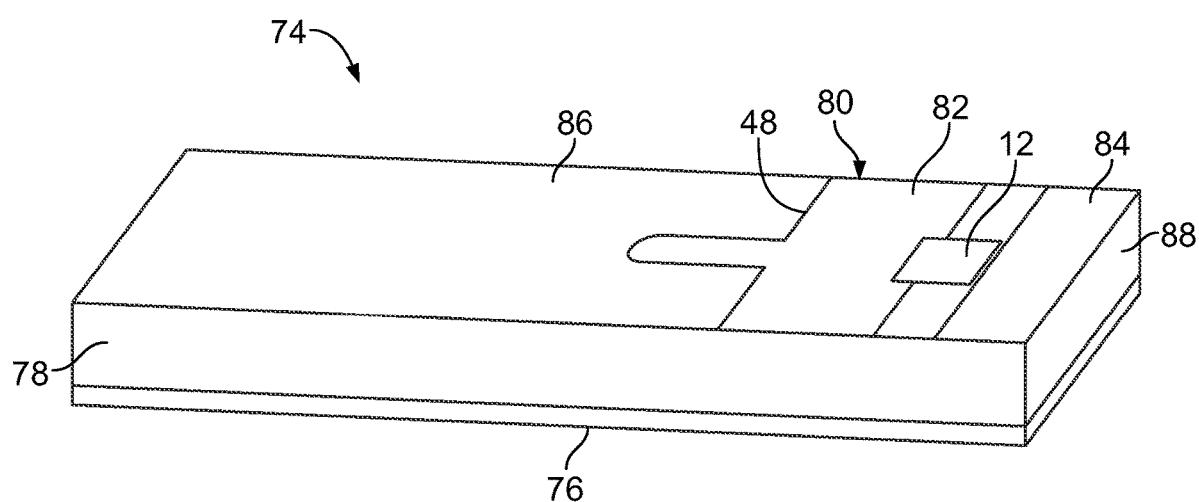
FIG. 8 is a perspective view of an RFID device configured to control thermal transfer from a surface or article to which the RFID device is secured.

FIG. 8 illustrates another RFID device 74 employing the principles described above with respect to the embodiment of FIG. 5. In the embodiment of FIG. 8, the RFID device 74 includes a ground plane 76 formed of a conductive material and having a first surface (the bottom surface in the orientation of FIG. 8) configured to be placed into contact with a surface or article. A non-conductive spacer 78 is secured to the surface of the ground plane 76 opposite the first surface (which opposing surface is the upper surface of the ground plane 76 in the orientation of FIG. 8). In one embodiment, the non-conductive spacer 78 is formed of a foam material, but other non-conductive materials may instead be employed without departing from the scope of the present disclosure.

A first antenna portion 80 (illustrated as a pair of foil elements 82 and 84) is secured to the surface of the non-conductive spacer 78 opposite the ground plane 76 (which opposing surface is the upper surface of the non-conductive spacer 78 in the orientation of FIG. 8), with the first antenna portion 80 being connected and coupled to an RFID chip 12 associated with the same surface of the non-conductive spacer 78. A second antenna portion 86 is mounted to the same surface of the non-conductive spacer 78 as the RFID chip 12. As in the embodiments of FIGS. 5-7, the second antenna portion 86 is separated from the RFID chip 12 and from the first antenna portion 80 by a thermally isolating gap 84, with the second antenna portion 86 being coupled (via electrical field, magnetic field, or both) to the RFID chip 12, while being thermally isolated therefrom. Optionally, the RFID chip 12 may be shielded against heat and light, as described above, for example.

The first antenna portion 80 is thermally coupled to the ground plane 76 by a conductor 88. By thermally coupling the ground plane 76 to the first antenna portion 80, the temperature of the ground plane 76 (and, hence, of the article or surface to which the ground plane 76 is secured) will be transferred to the first antenna portion 80 for detection by the temperature sensor of the RFID chip 12. The conductor 88 may be integrally formed with one or both of the first antenna portion 80 and the ground plane 76 or provided as a separate component. In the illustrated embodiment, the conductor 86 extends along or wraps around an edge of the non-conductive spacer 78 (being secured by a crimp or the like, for example), but it should be understood that it may associate the ground plane 76 and the first antenna portion 80 in some other way (e.g., by passing through the non-conductive spacer 78, rather than being wrapped around it).

An RFID device 74 of the type shown in FIG. 8 may be particularly advantageous for working with surfaces or articles that tend to be difficult material for a temperature-sensing RFID device to work with, for example liquids or wet materials such as meat or metal surfaces. By way of specific example, the ground plane 76 of an RFID device 74 of the type shown in FIG. 8 may be placed onto the forehead of a patient undergoing treatment, with the ground plane 76 maintaining good RF performance while being isolated from external heat, and having good thermal contact to the skin onto which it is placed. The use of a non-conductive spacer 78 between the ground plane 76 and the RFID chip 12 prevents heat from the environment from flowing between the two opposing surfaces of the spacer 78, thereby allowing the RFID device 74 to accurately monitor the article or surface temperature. When used to measure the temperature of a metallic article or surface, for example, the RFID device 74 will measure the temperature of the metal, but not rapid fluctuations associated with external influences such as sunlight.

It will be understood that the aspects, embodiments and examples described herein are illustrative examples of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A temperature-sensing RFID device, comprising:
an RFID chip including a temperature sensor;
an antenna electrically coupled to the RFID chip and adapted to receive energy from an RF field and produce a signal; and
a thermally conductive or absorbent structure associated with the RFID chip, oriented so as to be positioned between at least a portion of the RFID chip and an article to which the temperature-sensing RFID device is to be secured, and configured to enhance thermal coupling between the temperature sensor and said article, wherein the thermally conductive structure includes a portion of the antenna in direct contact with at least a portion of the RFID chip and configured to be in direct contact with said article.

2. The temperature-sensing RFID device of claim 1, wherein the antenna comprises
first and second conductors positioned at opposite lateral sides of the RFID chip and electrically coupled to the RFID chip by a strap, and
a conductive loop extending between the first and second conductors.

3. The temperature-sensing RFID device of claim 2, wherein a portion of the conductive loop is in direct contact with the RFID chip and configured to be in direct contact with said article.

4. The temperature-sensing RFID device of claim 2, wherein the conductive loop comprises
a bridge spaced away from the RFID chip and the first and second conductors,
a first leg extending between the first conductor and the bridge,
a second leg extending between the second conductor and the bridge, and
an extension extending between the RFID chip and the bridge, wherein a portion of the extension is in direct contact with the RFID chip and configured to be in direct contact with said article.

5. The temperature-sensing RFID device of claim 4, wherein the first leg is associated with a first end of the bridge, the second leg is associated with a second end of the bridge, and the extension is associated with a midsection of the bridge.

6. The temperature-sensing RFID device of claim 1, wherein at least a portion of the thermally conductive or absorbent structure is an infrared-absorbing color.

7. The temperature-sensing RFID device of claim 1, wherein the thermally conductive or absorbent structure includes an adhesive comprising particles having a greater thermal conductivity than the remainder of the adhesive.

8. The temperature-sensing RFID device of claim 1, wherein the thermally conductive or absorbent structure has a thermal mass selected for enhanced tracking of the temperature of said article.

* * * * *